United States Patent [19]

Verhoven

[11] Patent Number: 5,353,693
[45] Date of Patent: Oct. 11, 1994

[54] COFFEE MAKER

[76] Inventor: Martin Verhoven, 166 Robert St., Clintonville, Wis. 54929

[21] Appl. No.: 69,783

[22] Filed: Jun. 1, 1993

[51] Int. Cl.$^5$ ............................................. A47J 31/10
[52] U.S. Cl. .................................... 99/308; 99/281
[58] Field of Search ................ 99/279, 308, 310, 311, 99/312, 313, 314, 315, 307, 316, 280, 281, 282, 283; 426/433

[56] References Cited

U.S. PATENT DOCUMENTS

| | | | |
|---|---|---|---|
| 494,206 | 3/1893 | Jones | 99/308 |
| 1,646,022 | 10/1927 | Hagel | 99/315 |
| 3,858,494 | 1/1975 | Martin | 99/312 |
| 3,991,664 | 11/1976 | Yamato | 99/314 |
| 4,168,656 | 9/1979 | Wolfer | 99/311 |

Primary Examiner—Robert W. Jenkins
Attorney, Agent, or Firm—Ryan, Kees & Hohenfeldt

[57] ABSTRACT

A coffee percolator is provided with an inclined chamber extending upwardly and inclined toward the spout. The coffee basket is positioned away from the inclined surface of the percolation chamber so that coffee as it exits the basket runs uniformly across the surface of the coffee. A laser operated heating unit and a separated warming heater is used in order to enhance the quality of the brewed coffee.

6 Claims, 1 Drawing Sheet

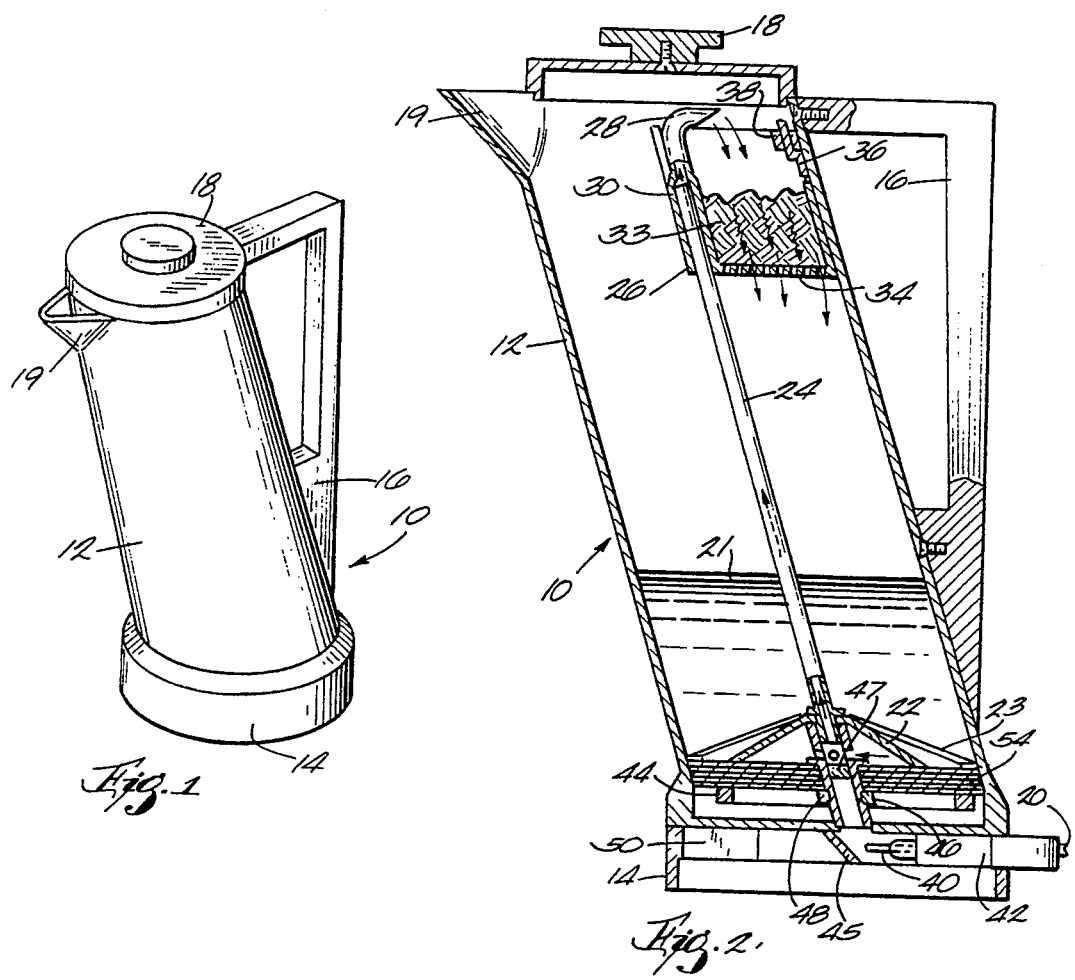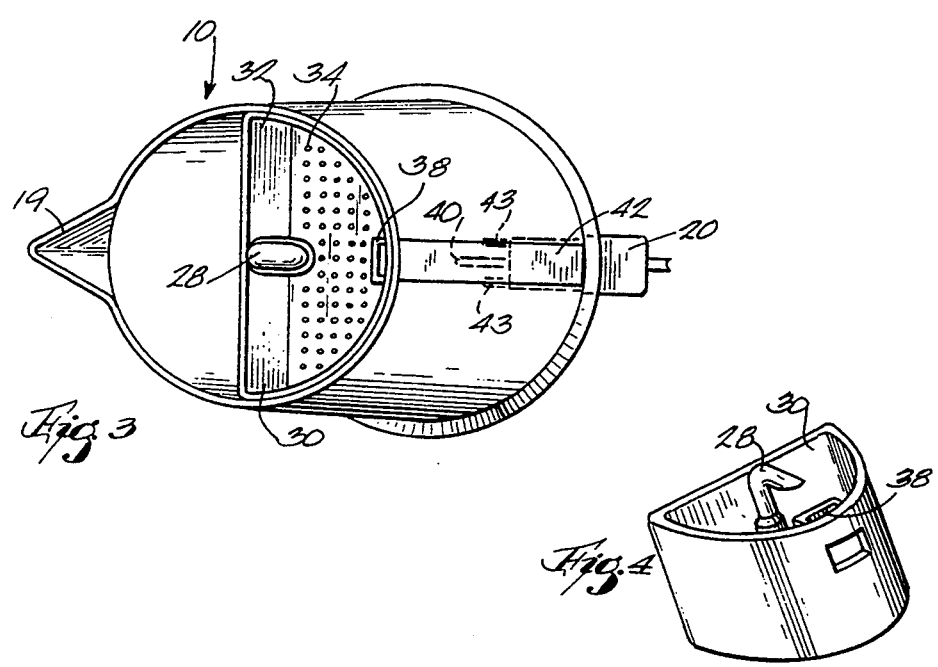

COFFEE MAKER

This invention relates to an improved coffee maker and more particularly to a coffee percolator provided with an dual heating elements and inclined surfaces for returning brewed coffee to the lower part of the percolator.

BACKGROUND OF THE INVENTION

Coffee percolators have long been used and are generally of a conventional upright design. More recently percolators have been largely supplanted in the marketplace by drip type coffee makers. A need has therefore existed for a coffee percolator that provides coffee having improved and enhanced flavor.

SUMMARY OF THE INVENTION

The present invention provides an improved coffee percolator in which the percolation chamber is inclined toward the spout and the coffee spaced from the spout so that coffee can readily be poured even with the basket in place.

Briefly summarized, the invention provides a coffee percolator including a base that contains a heating element and a separate warming element. Above the base is a percolation chamber that extends upwardly and is inclined at an oblique angle from the vertical toward the spout at the upper end of the chamber. A cupped percolation member of conventional design is centrally connected to a tube that conveys heated water upwardly from the bottom of the percolation chamber. The percolation tube is centrally located within the percolation chamber and inclined at the same angle as the chamber. The upper end of the percolation tube is bent away from the spout and directs water toward a basket for containing coffee grounds. The basket is positioned above the liquid in the bottom of the percolator but away from the spout, to thus permit pouring of coffee without the need for removal of the basket. Coffee percolated through the basket is drained uniformly to the bottom of the chamber even though the basket is positioned in only a portion of the chamber. The percolator can include thermostatic controls of conventional design.

The percolator is provided with two heating sources, thereby enabling the brewing to take place separately from the warming. In this manner the warming temperature can be increased significantly, for example, to 144° F. Layers of metal are provided within the base above the warming element to create a heat sink that provides a more even heat.

DRAWINGS

The invention will further be set forth In the following detailed description and with respect to the accompanying drawings, wherein:

FIG. 1 is a perspective view of a coffee percolator in accordance with the invention;

FIG. 2 is a side elevational central cross-sectional view of the percolator of FIG. 1;

FIG. 3 is a top view of the percolator; and,

FIG. 4 is a perspective view of a basket and spout assembly of the present invention.

DETAILED DESCRIPTION

Referring more particularly to the drawings there is seen a coffee percolator 10 in accordance with the invention. Percolator 10 includes a chamber 12 attached to a base 14 and being provided with a handle 16 and a lid 18. Chamber 12 is inclined as shown toward spout 19 at its upper end. Base 14 includes heating elements connected by an electric cord 20 to a source of electricity. Chamber 12 contains water 21 which is brewed into coffee. The cup member 22 of conventional design traps a portion of the water 21 and causes it when heated to be expelled upwardly through a tube 24. A spider 23 is preferably included to stably hold tube 24 in a central positon within chaber 12. Tube 24 is tightly fitted within a tube section 26 which has a curved end portion 28. Tube 26 is integral with basket 30. Basket 30 is divided by a panel 32 so that coffee grounds 33 contained on a perforated surface 34 are positioned only on the side of the pot opposite spout 19, and beneath the discharge end 28 of the tubing. A clip 36 is provided on the interior surface of chamber 12 to engage an indented portion 38 of basket 30 and thereby support it in the upper portion of chamber 12.

The coffee pot on the present invention is provided with two heating sources. A laser type heater 40 is built into an electric plug unit 42. One side of plug 42 controls laser heater 40. Element plugs 43 provide electrical energy to a heating element 44 of the resistance type. A deflector screen or mirror-like surface 45 is utilized to deflect the laser beam upwardly into breeze plug unit 46 and through an optically transmissive plug 47 therein. Plug 47 may be formed from glass, a polyacrylate polymer or similar optically transmissive material. The breeze plug unit is held in place by means of a clamp 48, which may be of the C-clamp type that fits into a groove in the outer surface of the plug 46. Thermostats 50 are provided to control the functioning of laser heater 40 and warming heater 44. The thermostat is set in conventional fashion to turn off laser heater 40 when the temperature of water 21 has reached a temperature indicative of sufficient brewing. The warming unit 44 is then turned on by the thermostat. An oil-rosin core 52 conducts heat from element 44 through a series of metal layers, preferably of a conductive type such as titanium, silver or copper or combinations of the same 54 formed in the base of chamber 12. These metal layers act as a heat sink that provides a more even heat to the chamber. The location of the warming unit 44 so that it extends outwardly beyond the perimeter of cup 22 makes possible the reheating of coffee in the pot 10 without repercolation thereof. This greatly improves the quality of the reheated coffee and reduces the bitterness that would otherwise result.

It has been found that the tilted shape of chamber 12 provides for improved convection patterns within the body of liquid in 21. Such mixing improves the temperature maintenance of the brewed coffee in the warming cycle.

In use, it will be observed that water 21 is expelled upwardly through tube 24 and is discharged over coffee grounds 33. The coffee after percolation through grounds 33 discharges across the interior surface chamber 12 even though the area of the basket is only approximately one-half that of the percolation chamber. The coffee brewed in accordance with the invention has an enhanced flavor as compared to that produced by other percolators. The precise reason for the improvement is not fully understood.

While preferred embodiments of the invention have been shown for purposes of illustration, it will be apparent to those skilled in the art that various modifications can be made within the spirit of the invention and the scope of the appended claims.

What is claimed is:

1. A coffee percolator comprising
   a base containing a heating element,
   a chamber extending upwardly and inclined at an oblique angle from the vertical toward a spout located on the upper end of said chamber,
   a cupped member centrally connected to a tube for conveying heated water upwardly from the bottom of said chamber, said tube being formed of and upper portion and a lower portion and being inclined and centrally located within said chamber, the upper end of said tube being bent away from said spout,
   a basket for containing coffee grounds spaced from said spout, whereby coffee percolated through said basket drains across the surface of the liquid at the bottom of said chamber, and wherein said upper portion of said tube is integral with said basket and said lower portion of the tube is tightly fitted into said upper portion.

2. A coffee percolator according to claim 1 wherein separate heating elements are provided for brewing of said coffee and for maintaining said coffee in a warm condition.

3. A percolator according to claim 2 wherein the heating element for brewing said coffee comprises a laser beam that is deflected by a reflective screen toward a breeze plug unit in the base of said cylinder.

4. A percolator according to claim 2 wherein the warming element is positioned radially outwardly beyond the radially outermost perimeter of the cupped member located in the bottom of the unit.

5. A percolator according to claim 1 wherein said basket is divided by an upwardly extending panel into a semi-circular shape.

6. A percolator according to claim 1 wherein a clip is provided on the interior surface of said cylinder to support said basket.

* * * * *